(12) United States Patent
Forker (10) Patent No.: US 11,319,170 B2
(45) Date of Patent: May 3, 2022

(54) RADIAL STACKING CONVEYOR SYSTEM WITH FEEDER

(71) Applicant: Stephen Forker, Sharon Center, OH (US)

(72) Inventor: Stephen Forker, Sharon Center, OH (US)

(*) Notice: Subject to any disclaimer, the term of this patent is extended or adjusted under 35 U.S.C. 154(b) by 0 days.

(21) Appl. No.: 16/968,742

(22) PCT Filed: Feb. 12, 2019

(86) PCT No.: PCT/US2019/017619
§ 371 (c)(1),
(2) Date: Aug. 10, 2020

(87) PCT Pub. No.: WO2019/160848
PCT Pub. Date: Aug. 22, 2019

(65) Prior Publication Data
US 2021/0016982 A1 Jan. 21, 2021

Related U.S. Application Data

(60) Provisional application No. 62/629,933, filed on Feb. 13, 2018.

(51) Int. Cl.
*B65G 65/28* (2006.01)
*B60P 1/36* (2006.01)
(Continued)

(52) U.S. Cl.
CPC ............ *B65G 65/28* (2013.01); *B60P 1/36* (2013.01); *B60P 1/56* (2013.01); *B65G 21/14* (2013.01);
(Continued)

(58) Field of Classification Search
CPC ...... B65G 65/28; B65G 21/14; B65G 41/005; B65G 41/008; B65G 47/58; B65G 47/18; B60P 1/36; F02B 63/047
(Continued)

(56) References Cited

U.S. PATENT DOCUMENTS 3,884,346 A 5/1975 O'Neill et al.
6,782,993 B2 * 8/2004 Bernard ............... B65G 41/008
198/300
(Continued)

FOREIGN PATENT DOCUMENTS

CA 2860261 A1 * 2/2016 ............. B65G 67/24
DE 102015104498 A1 * 9/2016 ............. B65G 41/002
WO WO-2014031740 A2 * 2/2014 ............. B65G 21/12

*Primary Examiner* — Gene O Crawford
*Assistant Examiner* — Lester Rushin, III
(74) *Attorney, Agent, or Firm* — Standley Law Group LLP; Stephen L. Grant; Kenny W. Pung (57) ABSTRACT

A device conveying a solid material into a radially-arranged stockpile. The device has a trailer chassis, with at least one wheeled axle at a first end thereof and, at a second end thereof, means provided for attaching the chassis to a tractor in a mobile condition and for fixed mounting in an operational condition. A stacking conveyor is mounted near the first end of the chassis. A power unit for generating electrical and hydraulic power is positioned on the chassis. A feed system is mounted to the chassis and extends generally along the length thereof from the second end to the first end, to receive the solid material at the second end and transport the solid material to the stacking conveyor.

2 Claims, 7 Drawing Sheets

(51) Int. Cl.
    *B60P 1/56*     (2006.01)
    *B65G 21/14*    (2006.01)
    *B65G 41/00*    (2006.01)
    *B65G 47/18*    (2006.01)
    *B65G 47/58*    (2006.01)
    *F02B 63/04*    (2006.01)

(52) U.S. Cl.
    CPC ......... *B65G 41/005* (2013.01); *B65G 41/008* (2013.01); *B65G 47/18* (2013.01); *B65G 47/58* (2013.01); *F02B 63/047* (2013.01)

(58) Field of Classification Search
    USPC ........................................................ 198/538
    See application file for complete search history.

(56) References Cited

U.S. PATENT DOCUMENTS

| | | | |
|---|---|---|---|
| 9,643,789 B2* | 5/2017 | Teichrob | B65G 41/005 |
| 9,783,093 B1 | 10/2017 | Esch | |
| 2011/0132719 A1* | 6/2011 | Tebbe | B65G 65/28 198/301 |
| 2013/0233682 A1* | 9/2013 | Werlinger | B65G 21/12 198/861.2 |
| 2016/0355351 A1 | 12/2016 | Enge et al. | |
| 2017/0297835 A1 | 10/2017 | Friesen | |
| 2017/0334654 A1 | 11/2017 | Friesen | |
| 2020/0010006 A1* | 1/2020 | Wilson | B65G 41/002 |

* cited by examiner

RADIAL STACKING CONVEYOR SYSTEM WITH FEEDER

CROSS-REFERENCE TO RELATED APPLICATIONS

This application is a non-provisional patent application of U.S. provisional application 62/629,933, filed on 13 Feb. 2018, which is incorporated by reference as if fully recited herein. This application makes a priority claim to the provisional application.

TECHNICAL FIELD

The disclosed embodiments of the present invention relate to a radial stacking conveyor that is mounted on a chassis. Also mounted on the chassis are a belt feeder, a swing bearing for rotating the stacking conveyor and a power pack for operating the individual components.

BACKGROUND

Portable stacking conveyors are known in the art for conveying a solid material from ground level to an above-ground discharge point. The material falls from the discharge point to form a generally conical discharge pile, the dimensions of which are generally defined by the natural angle of repose of the material.

Such a device has a conveyor body. The first end, which is positioned at or near ground level when in use, is adapted with a hopper to receive the material, hydraulics to raise or lower the angle of the conveyor body and power to drive belt arranged along the conveyor body. This first end is also typically provided with a hitch for towing the device. The device also is provided with a wheeled support structure. This structure typically has first and second arms that extend from an axle on which the wheel are located to points on the conveyor body. The angle of elevation and height of the second, or discharge, end of the conveyor body can be hydraulically controlled using these arms. In some cases, the length of the conveyor body is also variable, usually with hydraulics. The wheeled axle is located at or near the center of the length of the conveyor body.

In some circumstances, the wheels can be swiveled, so that the conveyor body can be moved angularly about a center point defined by the first end of the conveyor body. When this capability is provided, the discharge pile can have a profile, when viewed in plan view, that is annular rather than circular. However, this movement of the conveyor body is time consuming and represents downtime in which the discharge pile is not being built up. In the known prior art, the act of turning the axle into the position which allows the conveyor to be used as a radial conveyor requires the conveyor to be raised to its maximum stockpiling height. Then, the axle must be raised, either manually or by mechanical means, to turn the wheels to the desired side position. This operation is quite dangerous, as the conveyor, once raised in the air, is top heavy and can easily be flipped over. Once a stockpile area is filled, the operation has to be performed in reverse in order to move the conveyor forward. The act of moving the conveyor forward for more stockpiling (or to get it ready for transport) requires the conveyor to remain fully raised until it clears the stockpile while it is being moved, again providing a serious risk. Additionally, the base material under a raised conveyor needs to be well compacted, to reduce the risk of rollover. This latter issue is a matter of routine concern at many job sites, where the base material may be loose and the conditions can change with weather, other equipment moving around, and the like.

It is therefore an unmet advantage of the prior art to provide a radial stacking conveyor device in which all of the elements of the device are mounted on a chassis that significantly reduces downtime when rotating the conveyor body.

SUMMARY

This and other unmet advantages are provided by a device for conveying a solid material into a radially-arranged stockpile, comprising:

a trailer chassis, having, at a first end thereof, at least one wheeled axle and, at a second end thereof, means provided for attaching the chassis to a tractor in a mobile condition and for fixed mounting in an operational condition;

a stacking conveyor, mounted near the first end of the chassis;

a power unit for generating electrical and hydraulic power; and a feed system, mounted to the chassis and extending generally along the length thereof from the second end to the first end, to receive the solid material at the second end and transport the solid material to the stacking conveyor.

In some embodiments, the device further comprises a turret, providing the mounting of the stacking conveyor to the chassis, the turret arranged on a top surface of the chassis for rotation about an axis normal thereto, a first end of the stacking conveyor fixedly mounted to the turret.

In some of these embodiments, the axis of rotation of the turret is centered above the at least one wheeled axle and the first end of the stacking conveyor is located along the axis of rotation.

In some embodiments, the feed system comprises a feed hopper, a first feed conveyor and a second feed conveyor. In that case, solid material is loaded and stored in the feed hopper, moved from the feed hopper to the second feed conveyor by the first feed conveyor and moved to the first end of the stacking conveyor by the second feed conveyor.

In some embodiments, the second feed conveyor is an articulated conveyor, with an arm having first and second arm portions connected by an elbow joint, the arm movable between a folded or stowed condition for transport and an open or extended condition for operation.

In some embodiments, the power unit is mounted to the chassis between the feed system and the stacking conveyor.

In many of the embodiments, the stacking conveyor comprises a telescoping arm having a first portion and a second portion, such that the second portion is movable between a withdrawn position inside the first portion and an extended position outside of the first portion.

In many of the embodiments, the power unit is a diesel generator.

Other objects and advantages of the inventive concept are achieved by a method of conveying a solid material into a radially-arranged stockpile. This method comprises the first step of providing a device for stockpiling the solid material, comprising a trailer chassis, having, at a first end thereof, at least one wheeled axle and, at a second end thereof, means provided for attaching the chassis to a tractor in a mobile condition and for fixed mounting in an operational condition, a stacking conveyor, mounted near the first end of the chassis, a power unit for generating electrical and hydraulic power, and a feed system, mounted to the chassis and extending generally along the length thereof from the second end to the first end, to receive the solid material at the second end and transport the solid material to the stacking conveyor, wherein the stacking conveyor is mounted for rotation to the chassis atop a turret and the stacking conveyor has an arm with at least a withdrawn length and an extended length.

Then, the device is positioned at a location for the stockpile, establishing the turret of the device as a center from which the stockpile is deposited. From this point an initial stockpile is established through the substeps of:

rotating the stacking conveyor, using the turret, to an initial position;

depositing the solid material to a predetermined height, using the feed system and the stacking conveyor, with the arm in the withdrawn length; and extending the arm to the extended length and, without rotating the stacking conveyor, depositing further solid material, providing the initial stockpile with a higher height and further radial reach from the center.

From this point, a radially-arranged stockpile is established by establishing at least one secondary stockpile, adjacent to and abutting the initial stockpile, by the steps of:

rotating the stacking conveyor, using the turret, without moving the chassis on the at least one wheeled axle, by a predetermined angular amount;

depositing the solid material to a predetermined height, using the feed system and the stacking conveyor, with the arm in the withdrawn length;

extending the arm to the extended length and, without rotating the stacking conveyor, depositing further solid material, providing the stockpile with a higher height and further radial reach from the center; and repeating the steps for establishing the radially-arranged stockpile by establishing a predetermined number of secondary stockpiles.

BRIEF DESCRIPTION OF THE DRAWINGS

A better understanding of the disclosed embodiments will be obtained from a reading of the following detailed description and the accompanying drawings wherein identical reference characters refer to identical parts and in which.

DETAILED DESCRIPTION OF A PREFERRED EMBODIMENT

Figure 1:
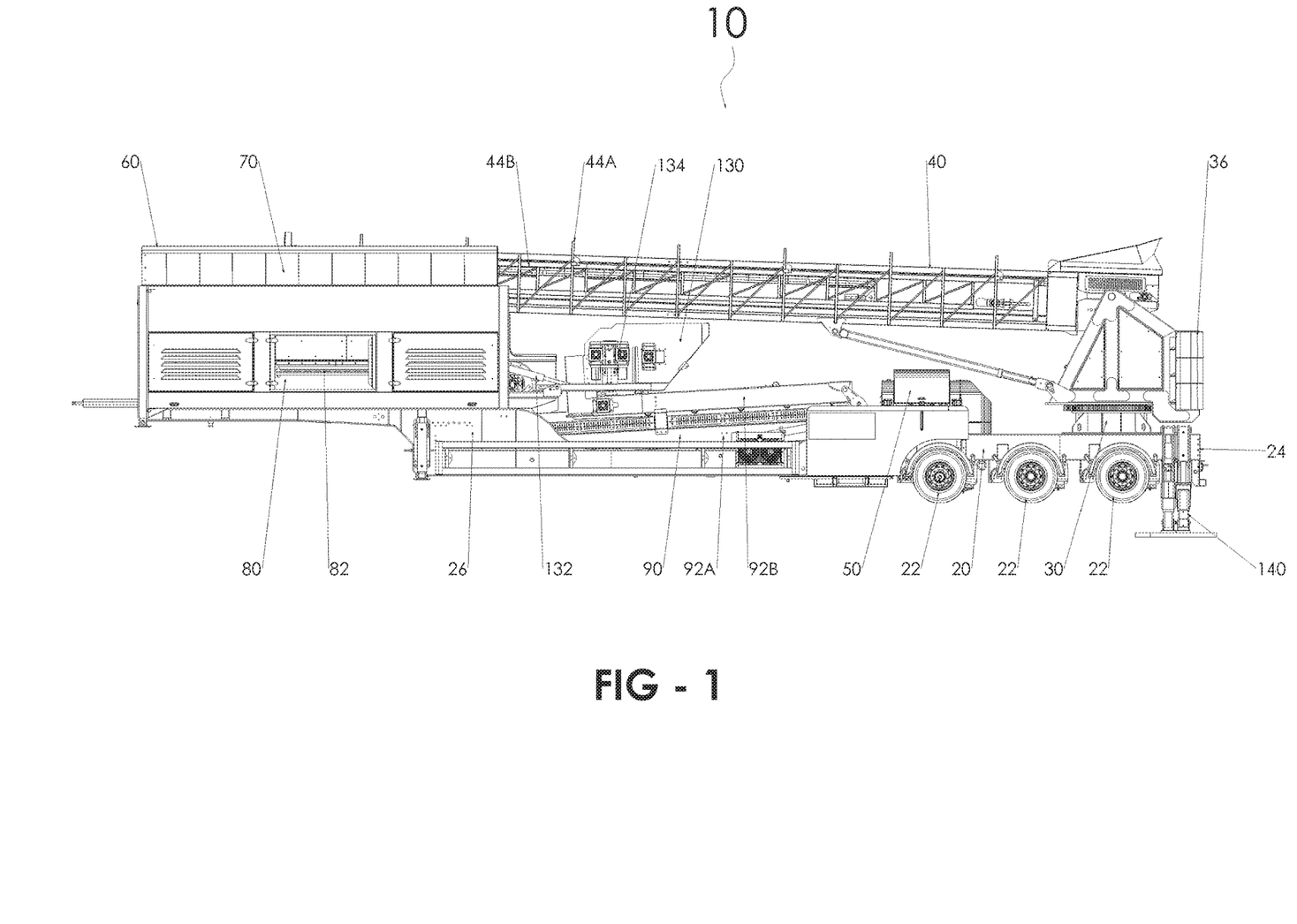
FIG. 1 is a side elevation view of an embodiment of the radial stacking conveyor system, in a stowed condition as during transport.
Figure 2:
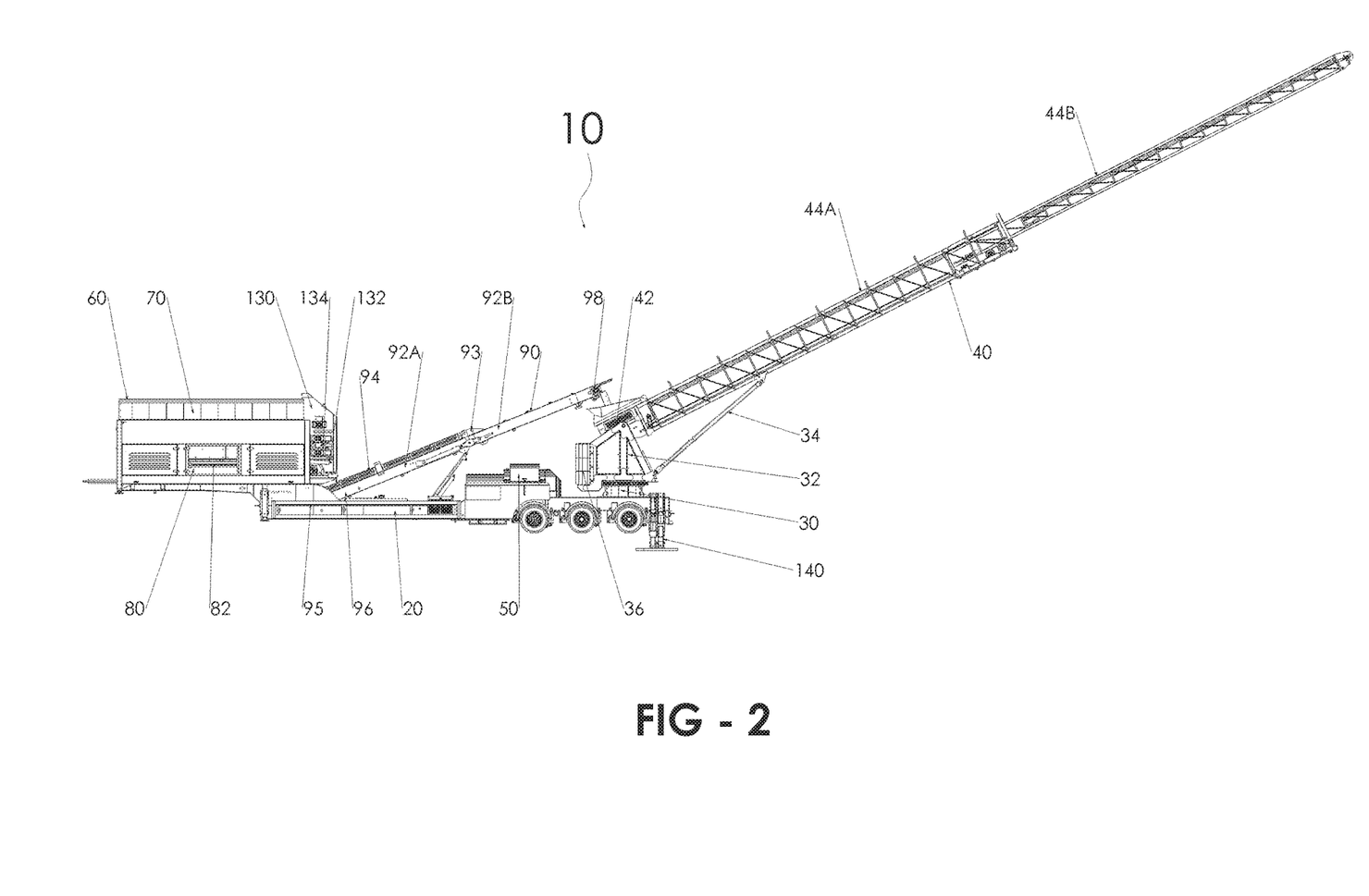
FIG. 2 is a side elevation view of the radial stacking conveyor system of FIG. 1, in an operative position.

FIGS. 1 and 2 show side elevation views of an embodiment 10 of the radial stacking conveyor system embodying the inventive design, with FIG. 1 showing the embodiment 10 in a stowed condition for transport and FIG. 2 showing the embodiment in a deployed condition for operation.

Primary to the embodiment 10 is a chassis 20, preferably of a conventional design, especially a chassis having a low deck. In a chassis 20 of this type, there will be at least one wheeled axle 22 at a first end 24 of the chassis. The depicted embodiment 10 has three such axles 22. The opposite second end 26 of the chassis 20 is adapted to be hitched to a tractor cab (not shown) and is further adapted to provide a base for the second end when not engaged to a tractor.

Several items are shown in FIG. 1 as being provided on the chassis. While exact placement as shown in FIG. 1 is not required, items are arranged in what is believed to be a preferred manner.

A turret 30, in the nature of a swing bearing and preferably configured for 360° rotation, is positioned directly atop the axles 22, near the first end 24 of the chassis 20. Mounted atop the turret 30 is a stacking conveyor 40, which will be described in more detail below. In FIG. 1, the stacking conveyor 40 is shown in a stowed condition, as it would be for transport of the system 10. FIG. 1 also shows a counterweight stack 36, positioned on the turret 30, for the purpose of balancing the weight loading.

Located generally amidships of the chassis 20 is a power unit 50, preferably a self-contained power unit, and more preferably, a diesel generator, for generating electrical and/or hydraulic power for use by the system 10. This power unit is of conventional design and its capacity will be determined by the power requirements of the system 10 as configured.

Moving further toward the second end 26 of the chassis 20 is a feed system 60, comprising, in the depicted embodiment, a feed hopper 70, a first feed conveyor 80 and a second feed conveyor 90. Of particular note is the fact that the second feed conveyor 90 is depicted as an articulated conveyor, with the arm 92 thereof being folded into a stowed condition, as it would be during transport. It is also a feature of many embodiments of second feed conveyor 90 to allow the lower section of the arm 92A to be inclined, with the lower section in a lowered condition in FIG. 1 and in a raised condition in FIG. 2.

It is also noted that, in the stowed condition of the system 10 as shown in FIG. 1, second feed conveyor 90 may rely upon power unit 50 for support and may be mechanically secured to the power unit during transport, although the preferred manner of stowing the second fed conveyor is to configure it to fold 180 degrees back onto itself and lower down into the chassis 20. In such a manner, the second feed conveyor does not need to rely upon the power unit 50 for any support. Similarly, a portion of stacking conveyor 40 may rely upon the second feed conveyor 90 for support and may be mechanically secured thereto during transport. The preferred manner of stowing the telescoping stacking conveyor 40 is to rotate it and lower its distal end into the top portion of the feed system 60.

In the stowed condition of FIG. 1, the highest elevation of the system 10 above the ground should be an upper surface of the stacking conveyor 40. This highest elevation will be set such that the system can be transported under any bridge or overpass that may be expected to be encountered. This may vary from region to region, but a typical maximum height of the system, when in the stowed condition, will be in the range of 13'6"±1'.

Although the depicted embodiment 10 shows a feed system 60, it is also desirable in alternate embodiments to modify this portion of the embodiment to allow for a direct truck unloading hopper to replace the belt feeder. In such a case, either an end dump truck or a belly dump truck can drive up and unload directly into the hopper, which would, in turn, feed the second feed conveyor 90 and telescopic boom stacker 40. Another alternate embodiment would have a small receiving hopper in lieu of the belt feeder. The small receiving hopper would accept material being fed from another chute or conveyor, allowing the embodiment to work in line with other processing equipment. It may also be possible in alternate embodiments to replace the axles 2 with another means for transporting the device, such as a crawler track undercarriage.

It is also noted that FIGS. 1 and 2 both show an agitator device 130 to one end of the belt feeder 60. This agitator 130 Is configured to break up material that has been fed into the feed system 60, to provide a steady and even flow of product to the second feed conveyor 90. In a preferred embodiment, the agitator 130 is designed to fold down hydraulically on top of the second feed conveyor 90 when not in use, so that the telescopic second conveyor 90 to pass over the top of it. The agitator 130 preferably has a plurality of rotating shafts (preferably three shafts) with the lower two of the shafts 134 horizontally movable to affect the spacing between the blades thereon and the feeder head gulley.

A pair of hydraulically-extendible outriggers 140 are located at the first end 24 of the chassis 20. These deploy in order to provide added stability for the system while operating, but they retract into the chassis 20 for transport.

FIG. 2 provides an elevation view of the same side of the system 10, but with the stacking conveyor 40 and the second feed conveyor 90 deployed in an operational condition. By comparison with FIG. 1, the mobility of the respective conveyors can be seen. First feed conveyor 80 is fixed in position below feed hopper 70. As bulk material is deposited in the feed hopper 70, a belt 82 of the first feed conveyor 80, preferably driven hydraulically, moves the bulk material axially along the chassis 20 in the direction from the second end 26 towards the first end 24. The bulk material drops off of the first feed conveyor 80 onto a feed platform 94 at a first or lower end 96 of the second feed conveyor 90. This articulated arm 92 is shown in an open or operative position in FIG. 2, while it is seen folded in FIG. 1. Articulated arm 92 comprises a first portion 92a and a second portion 92b, the portions being connected at an elbow joint 93. Power, typically hydraulic power, and especially hydraulic power from power unit 50, is used to pivot second portion 92b about the elbow joint 93. This pivoting action covers a range of up to about 150° to 160° in moving between the stowed and operational positions. Typically, conveyors 80, 90, will be aligned along a central axis of the chassis 20 and the stacking conveyor 40 will have a first end 42 thereof fixed along the same central axis. In this way, bulk material can move from the feed hopper 70 to the first end 42 of the stacking conveyor 40. As shown in FIG. 2, it may be preferred in some embodiments to use part of the power unit 50 as a support for the second feed conveyor 90, especially the first portion 92a of the articulated arm. As with the first feed conveyor 80, a belt 95 is driven by power to transport bulk material from a first end 96 of the second feed conveyor 90 to a second end 98. FIG. 2 also shows how the deployment of the articulated arm 92 into the operative position arranges the second end 98 above the first end 42 of stacking conveyor 40. It also shows how this first end 42 of stacking conveyor 40 is positioned at an end of rod 32 that extends upwardly from the turret 30, the rod 32 being essentially aligned along an axis of rotation of the turret 30.

A few additional features of the stacking conveyor 40 are seen in FIGS. 1 and 2. Stacking conveyor 40 preferably has a telescoping arm 44 made up of first portion 44a and second portion 44b. In the stowed condition of FIG. 1, the large majority of the length of second portion 44b is shown drawn into the length of first portion 44a. As is known in the conveyor art, this withdrawal of the second portion 44b into the first portion 44a, or the extension of the second portion out of the first portion, is achieved by known mechanical techniques, using electrical or hydraulic power. FIG. 2 also shows a hydraulic cylinder 34 is positioned between rod 32 and arm 44, so that it can raise or lower the angle of the arm relative to the ground.

Figure 3A:
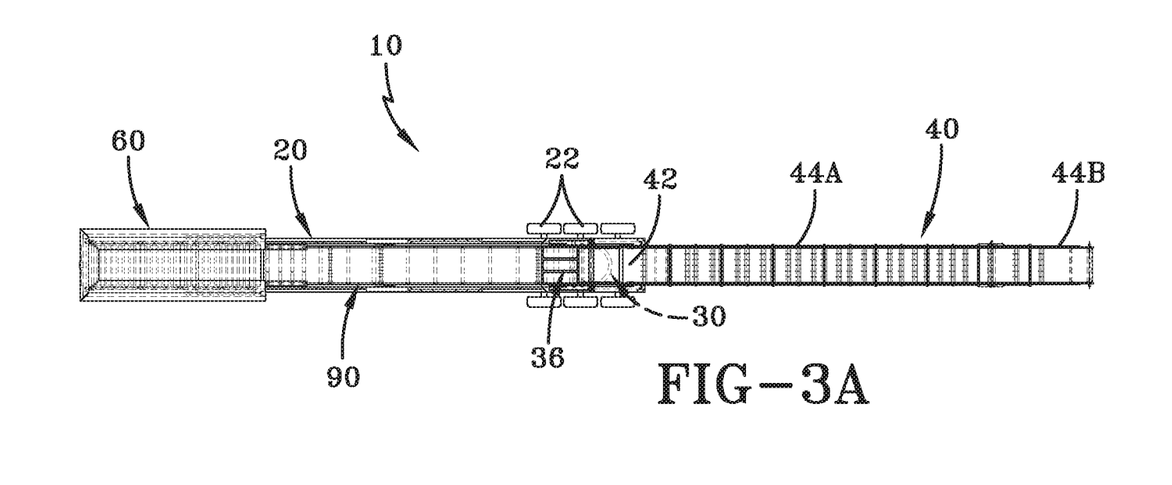
FIGS. 3A and 3B show, respectively, top plan views of the embodiment with the stacking conveyor in a withdrawn condition and in an extended condition.
Figure 3B:
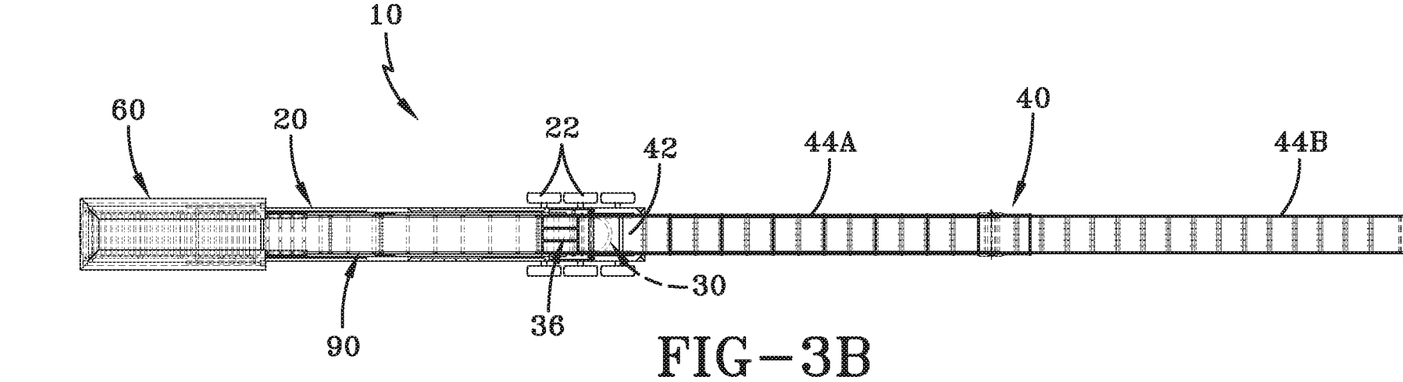

FIGS. 3a and 3b illustrate the ability of the stacking conveyor 40 to be extended or withdrawn, using the telescoping nature of the arm 44. In these top plan views, the arm 44 is shown as extending outwardly from the chassis 20, along the central axis of the chassis, in what has been referred to as the operative position. In FIG. 3a, the arm 44 is in the withdrawn position, with arm portion 44b telescoped into arm 44a. In FIG. 3b, the arm 44 is in the extended position, with arm portion 44b extended from arm 44a.

Figure 4:
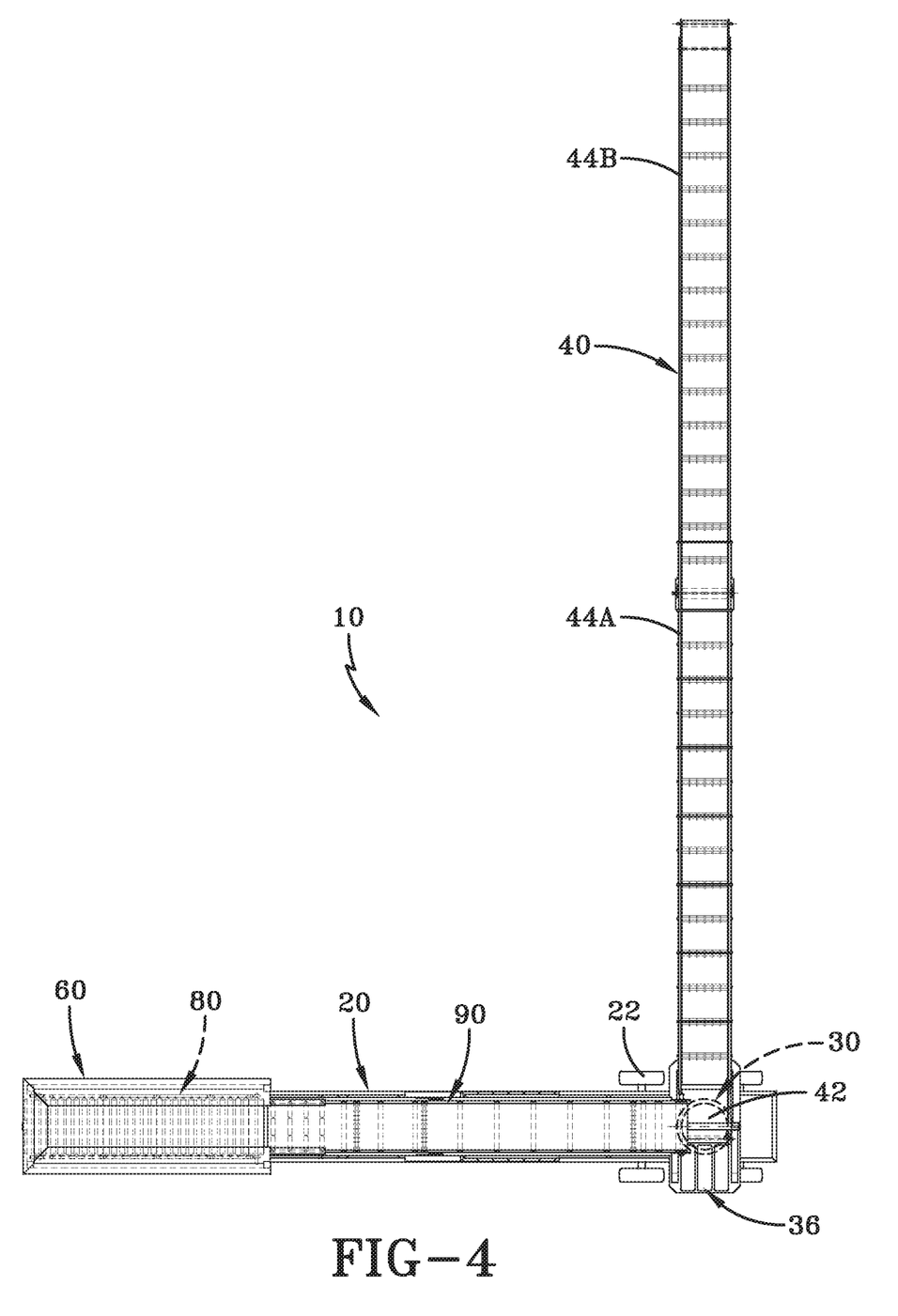
FIG. 4 shows a top plan view of the embodiment, with the stacking conveyor extending perpendicular to a central axis of the chassis.

FIG. 4 shows a top plan view of the embodiment 10, with arm 44 in the extended position, similar to FIG. 3b, except that the arm is extending perpendicular to the central axis of the chassis 20 in FIG. 4. While not explicitly shown in the figures, arm 44 can rotate, by use of the turret 30, through the 90° of rotation between the positions shown in FIGS. 4 and 3b. Likewise, the arm 44 can be rotated clockwise at least 90° from the FIG. 3b position, so that at least 180° of rotation is available to arm 44. This rotation is available in both the extended and withdrawn position. In fact, with reference to FIG. 1, it is also seen that arm 44 can be rotated 180° from the FIG. 3b position, demonstrating the ability of turret 30 to provide 360° total rotation of arm 44 about rod 32. Although a turret 30 may be useful in practicing the inventive concept while being limited to rotation through less than a full 360°, such full rotation is clearly preferred.

Figure 5A:
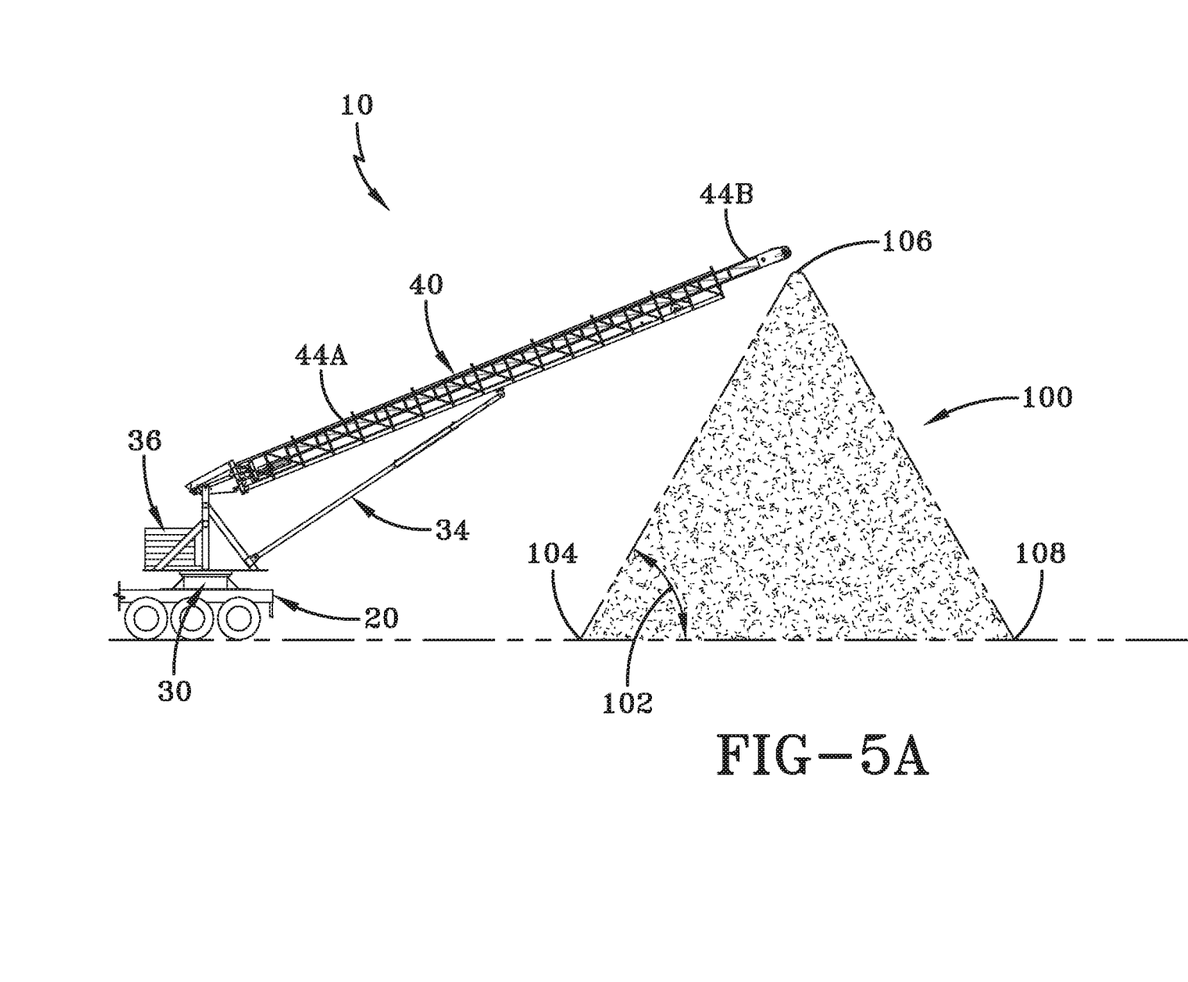
FIGS. 5A and 5B show, in respective side elevation views, the embodiment of the radial stacking conveyor system in two different operative positions, producing a discharge pile.
Figure 5B:
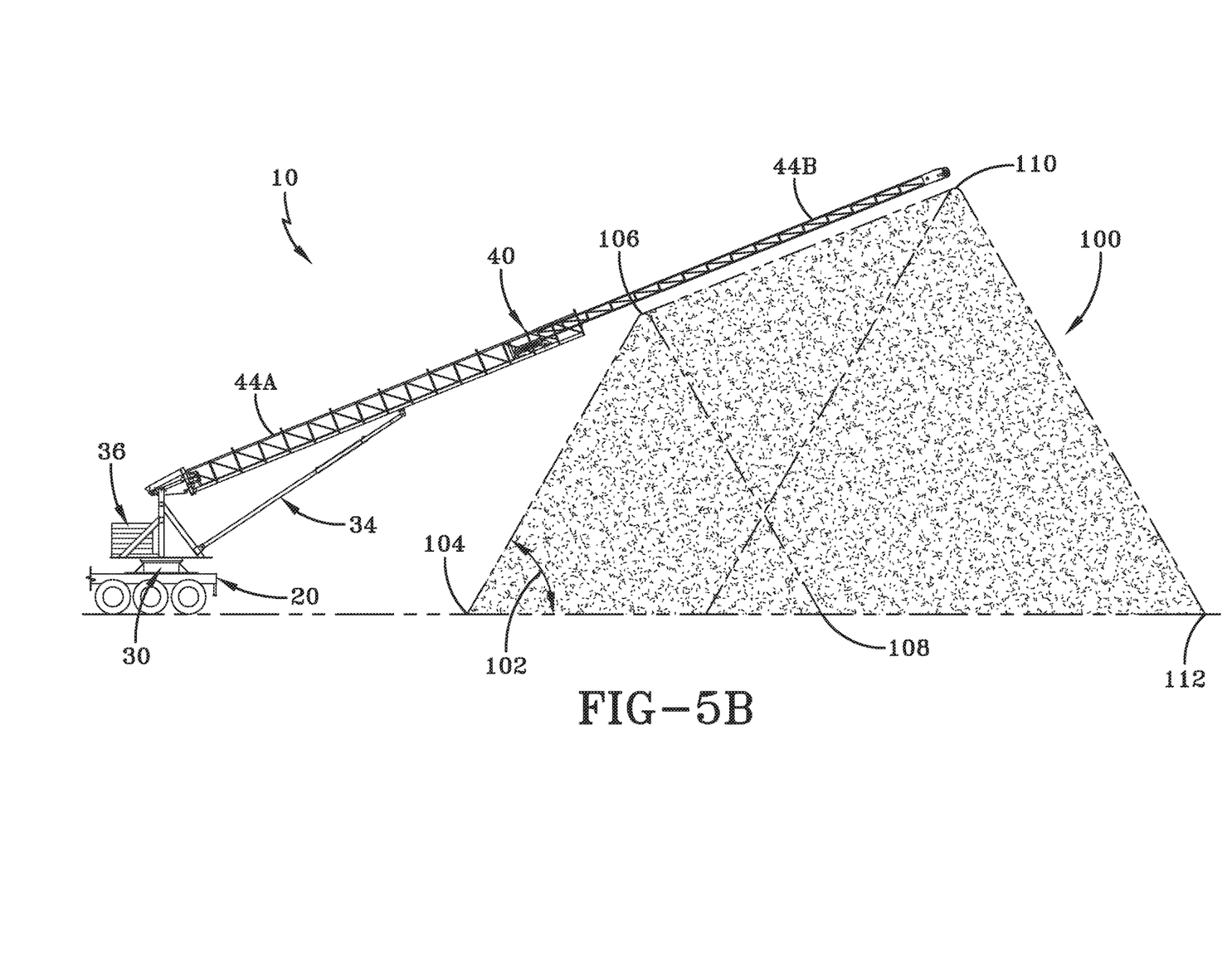
Figure 6:
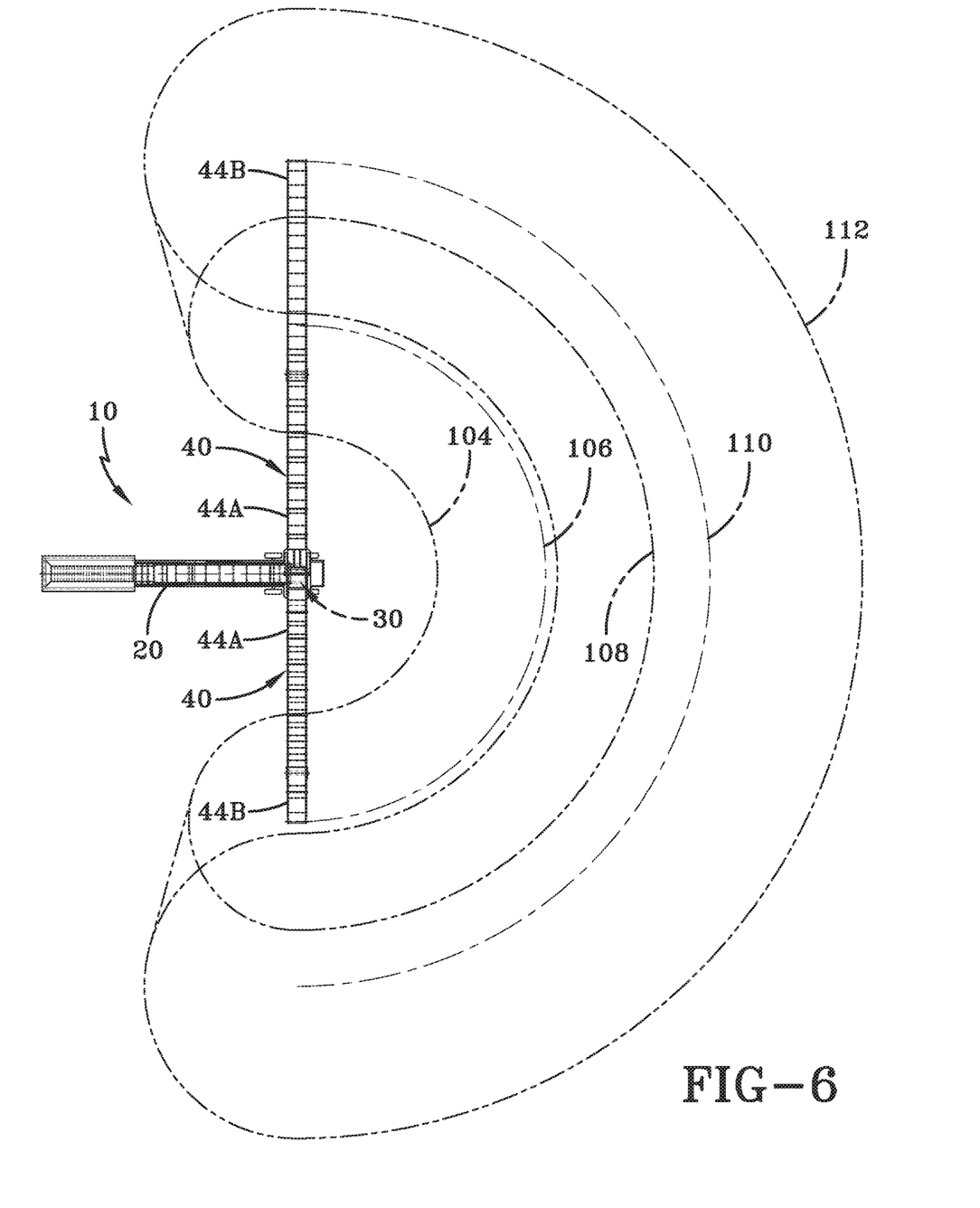
FIG. 6 is a top plan view of the embodiment of the radial stacking conveyor system in an operative position, producing a discharge pile.

FIGS. 5A, 5B and 6 demonstrate the ability of the embodiment 10 of the invention to utilize the extension capability of arm 44 to lay down a discharge pile 100 of a larger size than is possible without the extension capability. As seen in FIG. 5A, which is a side elevation view, the arm 44 is in a first operative position, with arm portion 44B withdrawn into arm portion 44A. In this condition, and assuming an angle of repose 102 of the particular bulk material being discharged, a cone (as seen in sectional view) defined by points 104, 106, 108 may be deposited. Then, and as seen in FIG. 5B, extending the arm 44 by extending arm portion 44B, puts the embodiment 10 into a second operative position, in which the profile of the discharge pile 100 can be that defined by points 104, 106, 110, 112.

Then, as shown in top plan view in FIG. 6, by using the rotation of the turret 30 and the first and second operative positions of arm 44, the discharge pile 100 that can be laid down is seen in top plan view. This discharge pile 100 is arranged about a center defined by the turret 20. Because the turret 30 is able to make the rotation, shown here through a 180° range, the chassis does not need to be physically moved from its position on the ground, which is a marked improvement from the prior art stacking conveyors. Of course, the angular rotation range of the turret 30 is sufficiently large that the arm 44 can be rotated all of the way back to the stowed position of FIG. 1 for transport.

With the foregoing explanation in mind, it is clear that an advantage provided with the inventive concept is that the weight being borne is centered at all times on the trailer chassis 20. The trailer chassis 20 remains level with the ground, and, if necessary may be supplemented with leveling means that would not be easily implemented in the prior art systems. The rotating turret 30 is, optionally but preferably provided with the counterweight stack 36, which rotates with the stacking conveyor, keeping the weighted load centered on the rotating mechanism which is centered between the axles. These features greatly reduce the rollover dangers when stockpiling to the maximum capacity, at any angle, allows the unit to be easily and safely moved forward from the stockpile and in fact allows the unit to be totally folded into the transport mode without even moving from the pile.

The combination of the feed conveyor and the telescopic rotating boom conveyor on the chassis also provides greatly increased stockpiling capacity when compared to the known prior art. The combination of adjustable height and telescoping length allow for more control of dust by allowing the discharge point of the material to be closer to the actual pile and also helps eliminate material segregation which occurs with the different size and density of the particles in the material being conveyed.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method of conveying a solid material into a radially-arranged stockpile, comprising the steps of:
    providing a device for stockpiling the solid material, comprising a trailer chassis, having, at a first end thereof, at least one wheeled axle and, at a second end thereof, means provided for attaching the chassis to a tractor in a mobile condition and for fixed mounting in an operational condition, a stacking conveyor, mounted near the first end of the chassis, a power unit for generating electrical and hydraulic power, and a feed system, mounted to the chassis and extending generally along the length thereof from the second end to the first end, to receive the solid material at the second end and transport the solid material to the stacking conveyor, wherein the stacking conveyor is mounted for rotation to the chassis atop a turret and the stacking conveyor has an arm with at least a withdrawn length and an extended length;
    positioning the device at a location for the stockpile, establishing the turret of the device as a center from which the stockpile is deposited;
    establishing an initial stockpile through the steps of:
        rotating the stacking conveyor, using the turret, to an initial position;
        depositing the solid material to a predetermined height, using the feed system and the stacking conveyor, with the arm in the withdrawn length; and
        extending the arm to the extended length and, without rotating the stacking conveyor, depositing further solid material, providing the initial stockpile with a higher height and further radial reach from the center; and
    establishing a radially-arranged stockpile by establishing at least one secondary stockpile, adjacent to and abutting the initial stockpile, by the steps of:
        rotating the stacking conveyor, using the turret, without moving the chassis on the at least one wheeled axle, by a predetermined angular amount;
        depositing the solid material to a predetermined height, using the feed system and the stacking conveyor, with the arm in the withdrawn length;
        extending the arm to the extended length and, without rotating the stacking conveyor, depositing further solid material, providing the stockpile with a higher height and further radial reach from the center; and
    repeating the steps for establishing the radially-arranged stockpile by establishing a predetermined number of secondary stockpiles.

2. A compact portable conveyor apparatus, the apparatus comprising: (a) a base suitable for transport on public roadways and having first and second opposing base ends; (b) a primary conveyor pivotably, about a substantially horizontal axis, and rotatably, about a substantially vertical axis, mounted near the first base end, the primary conveyor having a first primary conveyor end disposed near the first base end; (c) a feed conveyor having: (i) a pivoting segment pivotably mounted to the base near the second base end and disposed at least partially beneath a hopper; and (ii) an extending segment longitudinally-movably mounted to the pivoting segment and extending toward the first primary conveyor end; and (d) at least one arm mounted to the base, the extending segment and a prime mover for, upon actuation of the prime mover, displacing the extending segment longitudinally relative to the pivoting segment and simultaneously pivoting the pivoting segment relative to the base.

\* \* \* \* \*